US010839657B2

(12) United States Patent
Wakuda (10) Patent No.: US 10,839,657 B2
(45) Date of Patent: Nov. 17, 2020

(54) ROTATION-TYPE MANIPULATION DEVICE, CONTROL METHOD FOR THE SAME, AND PROGRAM

(71) Applicant: Alps Alpine Co., Ltd., Tokyo (JP)

(72) Inventor: Hiroshi Wakuda, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/653,474

(22) Filed: Oct. 15, 2019

(65) Prior Publication Data
US 2020/0043304 A1 Feb. 6, 2020

Related U.S. Application Data

(63) Continuation of application No. PCT/JP2018/015101, filed on Apr. 10, 2018.

(30) Foreign Application Priority Data

Apr. 21, 2017 (JP) .................. 2017-084369

(51) Int. Cl.
*G05G 1/08* (2006.01)
*G08B 6/00* (2006.01)
(Continued)

(52) U.S. Cl.
CPC ............ *G08B 6/00* (2013.01); *F16D 57/002* (2013.01); *G05G 1/08* (2013.01); *G05G 5/03* (2013.01);
(Continued)

(58) Field of Classification Search
CPC . G05G 5/03; G05G 1/08; G05G 25/00; G08B 6/00; G06F 3/0362; G06F 3/016; F16D 57/002; H02P 6/08; H02P 6/24
(Continued)

(56) References Cited

U.S. PATENT DOCUMENTS 6,838,851 B2 * 1/2005 Hayasaka ............... G06F 3/016
188/267.1
6,943,513 B2 * 9/2005 Hayasaka ............... G06F 3/016
318/432
(Continued)

FOREIGN PATENT DOCUMENTS

JP 2010-177387 A 6/1998
JP 2004-114201 A 4/2004
(Continued)

OTHER PUBLICATIONS

International Search Report from corresponding international application No. PCT/JP2018/015101, 9 pgs., dated Jul. 3, 2018.

*Primary Examiner* — Hung T Nguyen
(74) *Attorney, Agent, or Firm* — Brinks Gilson & Lione (57) ABSTRACT

A control signal is corrected according to the time-varying change of the detection value of a rotational angle, detected in a rotational angle sensor, of a manipulation member so that correction torque that makes the apparent inertia moment of the manipulation member different from intrinsic inertia moment is added to control torque. When the apparent inertia moment of the manipulation member is made different from intrinsic inertia moment, this apparent inertia moment can be made to adapt to the appearance of the texture of the manipulation member. Therefore, it is possible to efficiently reduce inconsistency in manipulation feeling due to the difference between the appearance of the texture of the manipulation member and a load felt in an actual manipulation.

8 Claims, 7 Drawing Sheets

(51) Int. Cl.
  *F16D 57/00* (2006.01)
  *G05G 5/03* (2008.04)
  *G06F 3/0362* (2013.01)
  *H02P 6/08* (2016.01)
  *H02P 6/24* (2006.01)

(52) U.S. Cl.
  CPC .............. *G06F 3/0362* (2013.01); *H02P 6/08* (2013.01); *H02P 6/24* (2013.01); *G05G 2505/00* (2013.01)

(58) Field of Classification Search
  USPC ...... 340/407.1, 671, 672; 318/432, 433, 799
  See application file for complete search history.

(56) References Cited

U.S. PATENT DOCUMENTS

| | | | |
|---|---|---|---|
| 9,130,496 B2 * | 9/2015 | Takai | H02P 21/22 |
| 2005/0016294 A1 * | 1/2005 | Onodera | G06F 3/0312 |
| | | | 73/862.08 |
| 2012/0081051 A1 * | 4/2012 | Kobayashi | B60K 6/48 |
| | | | 318/400.23 |
| 2017/0227980 A1 * | 8/2017 | Hafez | F16F 9/535 |

FOREIGN PATENT DOCUMENTS

| | | | | |
|---|---|---|---|---|
| JP | 2010-108009 A | * | 5/2010 | .............. G05G 5/03 |
| JP | 2010-211270 | * | 9/2010 | .............. G05G 5/03 |
| JP | 2010-211270 A | | 9/2010 | |
| JP | 2016-096833 | * | 5/2016 | ............ A63H 30/04 |
| JP | 2016-096833 A | | 5/2016 | |

\* cited by examiner

ROTATION-TYPE MANIPULATION DEVICE, CONTROL METHOD FOR THE SAME, AND PROGRAM

CLAIM OF PRIORITY

This application is a Continuation of International Application No. PCT/JP2018/015101 filed on Apr. 10, 2018, which claims benefit of priority to Japanese Patent Application No. 2017-084369 filed on Apr. 21, 2017. The entire contents of each application noted above are hereby incorporated by reference.

BACKGROUND

1. Field of the Disclosure

The present disclosure relates to a rotation-type manipulation device that can control a manipulation feeling accompanying a rotation manipulation and to a control method for the rotation-type manipulation device and a program.

2. Description of the Related Art

A known rotation-type manipulation device accepts an input for the switching of the transmission of a vehicle, volume adjustment for an audio device, or the like through the rotation of a manipulation member. A force sense imparting input device described in Japanese Unexamined Patent Application Publication No. 2004-114201, for example, has a manipulation member on which a rotation manipulation is performed by the manipulator, an electric actuator that gives torque to the manipulation member, a rotational angle detecting means for detecting the rotational angle of the manipulation member, a rotational speed detecting means for detecting the angular speed of the manipulation member, and a control means for controlling the electric actuator according to the rotational angle and angular speed of the manipulation member. This force sense imparting input device can produce a manipulation feeling similar to that from a clicking mechanism by controlling torque given from the electric actuator to the manipulation member according to the rotational angle and angular speed, involved in the rotation manipulation, of the manipulation member.

A manipulation feeling for a rotation-type manipulation device is based on a sense obtained through an actual manipulation such as a sense of a load that accompanies a rotation manipulation or a sense of shock transmitted to a finger. If a difference becomes large between that actual sense and a sense that the manipulator predicts, the manipulator may feel inconsistent.

With a vehicle-mounted device, for example, a process to give a metallic texture to the surface of a lightweight material such a resin may be performed to produce a high-quality appearance while weight reduction is performed. If the appearance of the texture of the manipulation member resembles a metal, the manipulator unconsciously predicts a heavy load matching a metal. If the load that the manipulator feels in the actual manipulation is lighter than is predicated by the manipulator, therefore, the difference in the sense gives inconsistency to the manipulator.

If the mass of the manipulation member differs, the inertia torque of the manipulation member differs. Therefore, this difference in the inertia torque affects the sense of the load of a rotation manipulation. The inertia torque of the manipulation member changes according to the inertia moment and angular acceleration of the manipulation member. Even if constant torque is given to the manipulation member by using an electric actuator or the like, the constant torque does not change according to the angular acceleration, unlike inertia torque. Therefore, it is not possible to eliminate the inconsistency described above from the manipulator.

SUMMARY

A rotation-type manipulation device according to a first aspect of the present invention has: a manipulation member that can be rotated according to a rotation manipulation; a torque generating unit that generates control torque used to drive the rotation of the manipulation member or apply a brake to the rotation in response to a received control signal; a rotational angle sensor that detects the rotational angle of the manipulation member; a control signal creating unit that creates the control signal matching the detection value of the rotational angle detected in the rotational angle sensor; and a first correcting unit that corrects the control signal according to the time-varying change of the detection value of the rotational angle so that correction torque that makes the apparent inertia moment of the manipulation member for the rotation manipulation different from intrinsic inertial moment is added to the control torque.

According to this structure, since the correction torque that makes the apparent inertia moment of the manipulation member for the rotation manipulation different from intrinsic inertial moment is added to the control torque, the apparent inertia moment of the manipulation member can be made to adapt to the appearance of the texture of the manipulation member. Therefore, it is possible to efficiently reduce inconsistency in manipulation feeling due to the difference between the appearance of the texture of the manipulation member and a load felt in an actual manipulation.

A second aspect of the present invention relates to a control method for a rotation-type manipulation device that has: a manipulation member that can be rotated according to manipulation torque applied through a rotation manipulation; a torque generating unit that generates control torque used to drive the rotation of the manipulation member or apply a brake to the rotation in response to a received control signal; and a rotational angle sensor that detects the rotational angle of the manipulation member. This control method has: creating the control signal matching the detection value of the rotational angle detected in the rotational angle sensor; and correcting the control signal according to the time-varying change of the detection value of the rotational angle so that correction torque that makes the apparent inertia moment of the manipulation member for the rotation manipulation different from intrinsic inertial moment is added to the control torque.

The rotation-type manipulation device may have a torque sensor that detects torsional torque exerted between a portion to which the manipulation torque is applied in the manipulation member and a portion to which the control torque is applied. The control method for the rotation-type manipulation device may have correcting the control signal so that error torque becomes small, the error torque being the difference between the control torque corresponding to the control signal and the control torque inferred according to the detection value of the torsional torque and the detection value of the rotational angle.

A third aspect of the present invention relates to a non-volatile memory having program stored therein that causes a computer to execute the control method for a rotation-type manipulation device according to the above second aspect.

DESCRIPTION OF THE EXEMPLARY EMBODIMENTS

Figure 1:
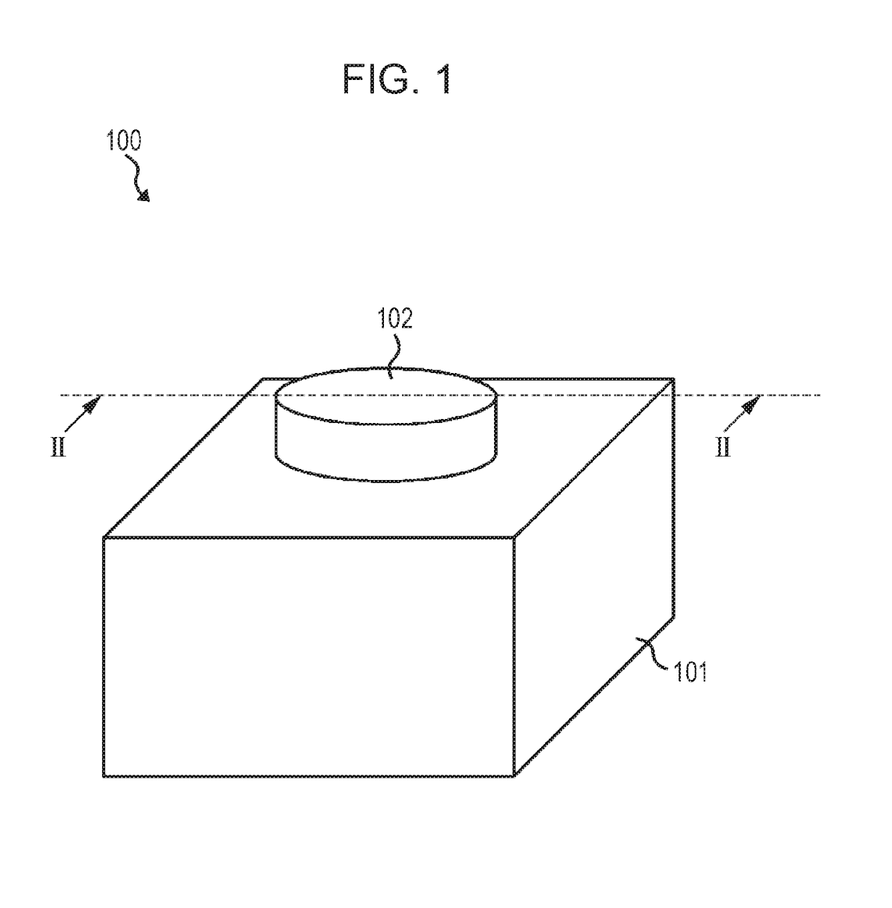
FIG. 1 is a perspective view illustrating an example of the appearance of a rotation-type manipulation device according to an embodiment of the present invention.
Figure 2:
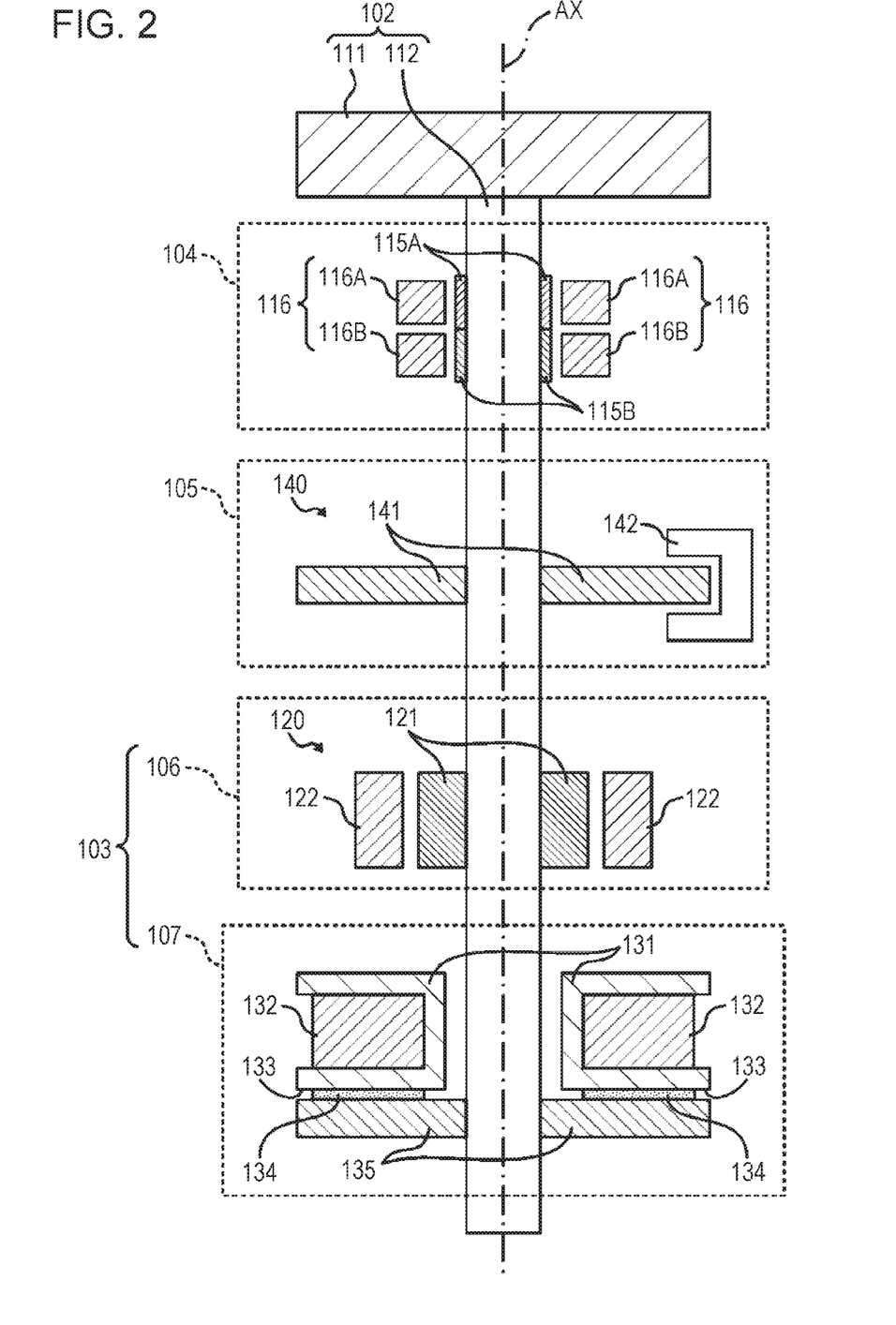
FIG. 2 is a partial cross-sectional view of the rotation-type manipulation device as taken along line II-II in FIG. 1.
Figure 3:
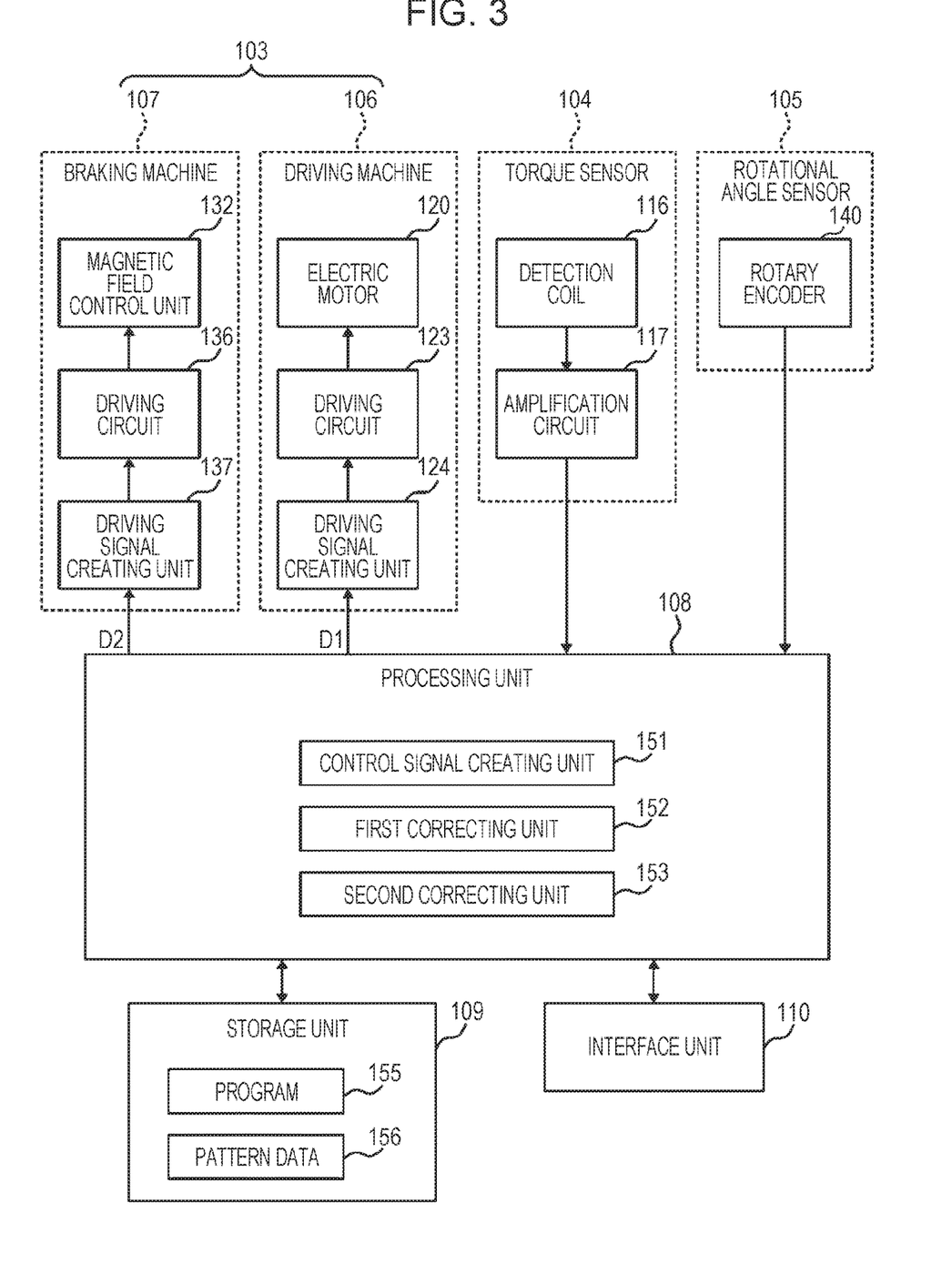
FIG. 3 is a block diagram illustrating an example of the structure of the rotation-type manipulation device illustrated in FIG. 1.

A rotation-type manipulation device according to an embodiment of the present invention will be described below with reference to the drawings. FIG. 1 is a perspective view illustrating an example of the appearance of the rotation-type manipulation device 100 according to this embodiment. FIG. 2 is a partial cross-sectional view of the rotation-type manipulation device 100 as taken along line II-II in FIG. 1. FIG. 3 is a block diagram illustrating an example of the structure of the rotation-type manipulation device 100 illustrated in FIG. 1.

As illustrated in FIG. 1, the rotation-type manipulation device 100 has a manipulation member 102 that can be rotated through a rotation manipulation by the manipulator, and also preferably has a case 101 that rotatably supports the manipulation member 102. The rotation-type manipulation device 100 creates manipulation information related to rotation manipulations such as, for example, the rotational angle, rotational position, and rotational speed of the manipulation member 102. The rotation-type manipulation device 100 is used to, for example, adjust the volume of an audio device or switch the transmission of a vehicle.

The cut surface in FIG. 2 passes along the rotational axis AX of the manipulation member 102. As illustrated in FIG. 2, the manipulation member 102 preferably includes a shaft 112 that is rotatably supported by the case 101, and also preferably includes a knob 111 fastened to the shaft 112. The shaft 112 is accommodated in the case 101. The knob 111, which is exposed to the outside of the case 101, receives a rotation manipulation by the manipulator. In the examples in FIGS. 1 and 2, the knob 111 and shaft 112 have a columnar shape the central axis of which is the rotational axis AX and thereby integrally rotate around the rotational axis AX.

As illustrated in FIG. 2, the rotation-type manipulation device 100 has a torque generating unit 103, a torque sensor 104, and a rotational angle sensor 105 as the structure of a mechanical system. The torque generating unit 103, torque sensor 104, and rotational angle sensor 105 are accommodated in the case 101 so as to be disposed along the shaft 112 of the manipulation member 102.

As illustrated in FIG. 3, the rotation-type manipulation device 100 further includes a processing unit 108, a storage unit 109, and an interface unit 110 as the structure of a control system.

Torque Generator

The torque generating torque unit or torque generator 103 preferably generates control torque T1 used to drive the rotation of the manipulation member 102 or apply a brake to the rotation in response to control signals (D1 and D2) received from the processing unit 108 (FIG. 3) described later. In the example in FIG. 2, the torque generating unit 103 preferably includes a driving machine 106 and a braking machine 107.

The driving machine 106 preferably generates driving torque Td that drives the rotation of the manipulation member 102 in response to a first control signal D1 received from the processing unit 108. The driving machine 106 includes an electric motor 120 such as a direct current (DC) motor as indicated in, for example, FIG. 2. In the example in FIG. 2, the electric motor 120 includes a plurality of rotors 121 that rotate together with the shaft 112, and also includes a plurality of stators 122 disposed opposite to the rotors 121. The rotor 121 is, for example, a permanent magnet, and the stator 122 is, for example, a coil. When a driving current with a predetermined waveform is supplied to each coil of the plurality of stators 122, a magnetic field exerted on the plurality of rotors 121 is generated and driving torque Td that drives the rotation of the plurality of rotors 121 together with the shaft 112 is generated. The magnitude of driving torque Td changes according to the magnitude of the driving current to be supplied to the coil of the stator 122.

The driving machine 106 further includes a driving circuit 123 and a driving signal creating unit 124 as illustrated in FIG. 3. The driving circuit 123 generates a driving current responsive to a received driving signal, and supplies the driving current to each of the plurality of stators 122 of the electric motor 120. The driving signal creating unit 124 creates a driving signal responsive to the first control signal D1 received from the processing unit 108, and inputs the driving signal to the driving circuit 123. The first control signal D1 sets the magnitude of the driving current to be supplied to the coil of the stator 122. The driving signal creating unit 124 creates the driving signal so that a driving current matching the setting of this first control signal D1 is supplied.

For example, the driving signal creating unit 124 includes a digital-analog (D/A) converter that outputs an analog driving signal having an amplitude matching the signal value (digital value) of the first control signal D1. Alternatively, the driving signal creating unit 124 may include a smoothing circuit that smoothes a pulse width modulate (PWM) signal that has been subjected to pulse width modulation according to the signal value (digital value) of the first control signal D1, and outputs the PWM signal as the driving signal.

The driving machine 106 is not restricted to the electric motor 120 described above, but may include any of other various types of motors that use other power sources to generate torque.

The braking machine 107 preferably generates braking torque Tb that applies a brake to the rotation of the manipulation member 102, in response to the second control signal D2 received from the processing unit 108. For example, the braking machine 107 preferably includes a magneto-rheological fluid 134 in contact with the manipulation member 102 and a magnetic field control unit 132 that controls a magnetic field exerted on the magneto-rheological fluid 134.

The magnetic field control unit or controller 132 generates a magnetic field responsive to the second control signal D2, and changes the viscosity of the magneto-rheological fluid 134 by using the magnetic field. The magnetic field control unit 132 is, for example, a coil wound around the shaft 112 in a ring shape. As illustrated in FIG. 2, the magnetic field control unit 132 is disposed in a coil case 131, in a ring shape, which is fastened to the shaft 112 of the manipulation member 102. The coil case 131 has an opposing surface 133 substantially perpendicular to the rotational axis AX. A resistive disc 135, in a discoid shape, that has a surface substantially perpendicular to the rotational axis AX is fastened to the shaft 112. The resistive disc 135 and coil case 131 are disposed so that one surface of the resistive disc 135 and the opposing surface 133 of the coil case 131 come close to each other. The magneto-rheological fluid 134 is supplied into a clearance between the resistive disc 135 and the opposing surface 133 of the coil case 131, and is sealed in this clearance with a sealing member (not illustrated).

When a driving current flowing in the magnetic field control unit 132 changes, the magnetic field passing through the magneto-rheological fluid 134 changes. Then, a force with which particles constituting the magneto-rheological fluid 134 are bonded changes due to the change in the magnetic field. The viscosity of the magneto-rheological fluid 134 thereby changes due to the change in the bonding force of the particles. When the viscosity of the magneto-rheological fluid 134 changes, a force that impedes relative rotation between the coil case 131 and the resistive disc 135, that is, a friction force, changes. The larger this friction force is, the larger the braking torque Tb that applies a brake to the rotation of the manipulation member 102 is. The magnitude of the braking torque Tb changes according to the magnitude of the driving current flowing in the magnetic field control unit 132.

The braking machine 107 further includes a driving circuit 136 and a driving signal creating unit 137 as illustrated in FIG. 3. The driving circuit 136 generates a driving current responsive to a received driving signal and supplies the driving current to the magnetic field control unit 132. The driving signal creating unit 137 creates a driving signal responsive to the second control signal D2 received from the processing unit 108, and inputs the driving signal to the driving circuit 136. The second control signal D2 sets the magnitude of the driving signal to be supplied to the magnetic field control unit 132. The driving signal creating unit 137 creates the driving signal so that a driving current matching the setting of this second control signal D2 is supplied.

For example, the driving signal creating unit 137 includes a D/A converter that outputs an analog driving signal having an amplitude matching the signal value (digital value) of the second control signal D2. Alternatively, the driving signal creating unit 137 may include a smoothing circuit that smoothes a PWM signal that has been subjected to pulse width modulation according to the signal value (digital value) of the second control signal D2, and outputs the PWM signal as the driving signal.

The braking machine 107 is not restricted to using the viscosity of the magneto-rheological fluid 134 as described above. Braking torque Tb may be generated in any of other various methods. For example, the braking machine 107 may generate braking torque Tb by a method in which a member is mechanically brought into contact with the manipulation member 102 or a method in which an electromagnetic force is used.

Rotational Angle Sensor

The rotational angle sensor 105 detects the rotational angle of the manipulation member 102. The rotational angle sensor 105 includes, for example, a rotary encoder 140. The rotary encoder 140 includes a detecting disc 141, in a discoid shape, that is fastened to the shaft 112 of the manipulation member 102, and also includes an optical detecting unit 142 disposed so as to come close to the vicinity of the outer circumferential edge of the detecting disc 141, as indicated in, for example, FIG. 2. A plurality of holes are formed in the vicinity of the outer circumferential edge of the detecting disc 141. The optical detecting unit 142 optically detects the presence or absence of these holes. The rotational angle of the manipulation member 102 is detected from a detection result from the optical detecting unit 142.

The rotational angle sensor 105 may detect the rotational angle by any of other various methods without being restricted to the rotary encoder 140 described above. For example, the rotational angle sensor 105 may detect the rotational angle according to a change in a magnetic field due to the permanent magnets fastened to the shaft 112 or may detect the rotational angle by a sensor in which its resistance value or another physical quantity changes according to the rotation of the shaft 112.

Torque Sensor 104

The torque sensor 104 preferably detects torsional torque Ts exerted between a portion, in the manipulation member 102, to which manipulation torque T2 due to a rotation manipulation is applied and a portion, in the torque generating unit 103, to which control torque T1 is applied. Specifically, the torque sensor 104 preferably detects torsional torque Ts exerted between a portion to which driving torque Td and braking torque Tb are applied on the shaft 112 and a portion to which the knob 111 is fastened.

The torque sensor 104 detects torsional torque Ts by, for example, using the magnetostriction effect of a ferromagnetic material. In the example in FIG. 2, the torque sensor 104 has magnetostrictive films 115A and 115b formed on the shaft 112, a detection coil 116A wound around the magnetostrictive film 115A, and a detection coil 1166 wound around the magnetostrictive film 115b. In FIG. 2, the detection coil 116A and detection coil 116B are represented together as a detection coil 116. The torque sensor 104 includes an amplification circuit 117 that amplifies the difference between an output signal from the detection coil 116A and an output signal from the detection coil 116B.

The magnetostrictive films 115A and 115B have a mutually opposite magnetic anisotropy. When the permeability of one of the magnetostrictive films 115A and 115B is increased according to torsional torque Ts exerted on the shaft 112, the permeability of the other is reduced. The detection coils 116A and 116B are magnetically coupled to exciting coils (not illustrated). Each of the detection coils 116A and 116B outputs an electromagnetically induced signal in response to a signal applied to the exciting coil. The difference between the output signals of the detection coils 116A and 116B changes according to the difference in permeability between the magnetostrictive films 115A and 115B. The difference represents the magnitude of torsional torque Ts. The torque sensor 104 outputs a signal equivalent to the difference between the output signals of the detection coils 116A and 116B as a detection result for torsional torque Ts.

The torque sensor 104 is not restricted to the method in which the magnetostriction effect described above is used, but may detect torsional torque Ts by any of other various methods. For example, the torque sensor 104 may detect torsional torque Ts by a method in which a signal from a torque gage attached to the shaft 112 is output through a slip ring or the like.

As illustrated in FIG. 2, the knob 111 is fixed to one side of the shaft 112 with the torque sensor 104 intervening, and the rotational angle sensor 105 and torque generating unit 103 are disposed on the other side of the shaft 112. In the example in FIG. 2, the rotational angle sensor 105 is positioned closer to the torque sensor 104 than is the torque generating unit 103. In the torque generating unit 103, the driving machine 106 is positioned closer to the torque sensor 104 than is the braking machine 107.

Processing Unit 108

The processing unit 108 is a device that executes processing such as control involved in the operation of the rotation-type manipulation device 100 and input and output of data. For example, the processing unit 108 includes a computer that executes various types of processing according to a program 155 stored in the storage unit 109. The processing unit 108 may execute all processing by the computer or may execute at least part of processing by specific hardware (logic circuit).

The processing unit 108 includes a control signal creating unit 151, a first correcting unit 152, and a second correcting unit 153 as constituent elements that perform processing involved in control of torque (control torque T1) generated in the torque generating unit 103.

Control Signal Creating Unit 151

The control signal creating unit 151 creates control signals (D1 and D2) matching the detection value of a rotational angle detected in the rotational angle sensor 105. Specifically, the control signal creating unit 151 preferably creates the first control signal D1 and second control signal D2 that have a signal value corresponding to the detection value of the rotational angle, according to a preset correspondence between the rotational angle of the manipulation member 102 and the signal value of the first control signal D1 and to a preset correspondence between the rotational angle of the manipulation member 102 and the signal value of the second control signal D2. The storage unit 109 stores the correspondence between the rotational angle of the manipulation member 102 and the signal value of the first control signal D1 and the correspondence between the rotational angle of the manipulation member 102 and the signal value of the second control signal D2 are stored in the storage unit 109, as pattern data 156.

The control signal creating unit 151 references this pattern data 156 and creates the first control signal D1 and second control signal D2 matching the detection value of the rotational angle.

Figure 4:
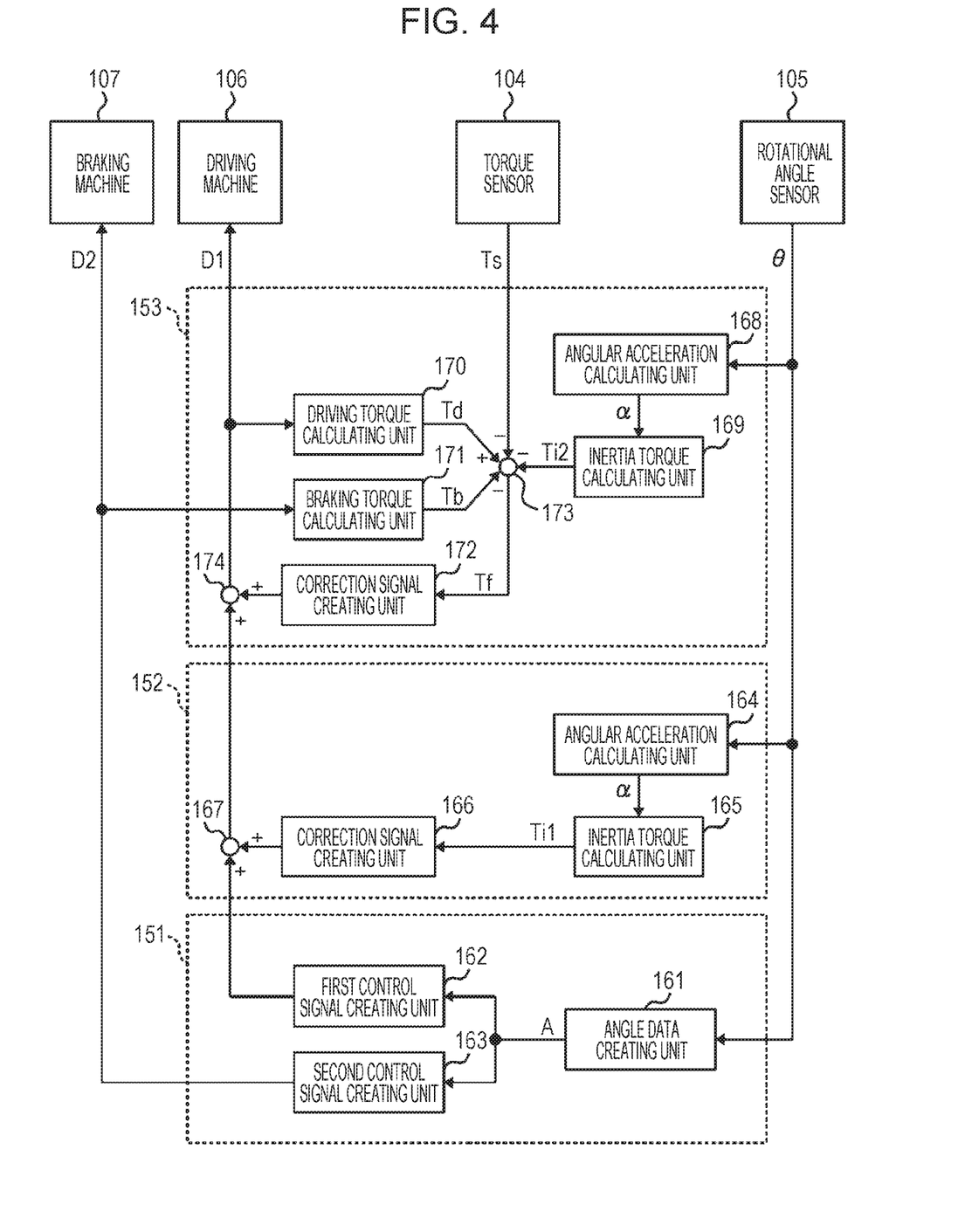
FIG. 4 is a block diagram illustrating an example of a structure involved in creation and correction of control signals for control torque.

FIG. 4 is a block diagram illustrating an example of a structure involved in creation and correction of control signals (D1 and D2) for control torque T1. In the example in FIG. 4, the control signal creating unit 151 includes an angle data creating unit 161, a first control signal creating unit 162, and a second control signal creating unit 163.

The angle data creating unit 161 creates angle data A matching the detection value of a rotational angle detected in the rotational angle sensor 105. For example, the angle data creating unit 161 converts the detection value of a rotational angle in a range within which the manipulation member 102 can be rotated to angle data A that represents a relative rotational angle in each of a plurality of angle ranges included in this range. As a specific example, it will be assumed that there is no limitation on the range within which the manipulation member 102 can be rotated, the range of one rotation (360°) is divided into 12 angle ranges, each of which has a width of 30°. In this case, the angle data creating unit 161 changes angle data A from 0° to 30° 12 times during a period in which the detection value of the rotational angle changes from 0° to 360°.

The first control signal creating unit 162 creates the first control signal D1 having a signal value corresponding to angle data A, according to a correspondence, included in the pattern data 156, between angle data A and the signal value of the first control signal D1.

The second control signal creating unit 163 creates the second control signal D2 having a signal value corresponding to angle data A, according to a correspondence, included in the pattern data 156, between angle data A and the signal value of the second control signal D2.

Figure 5:
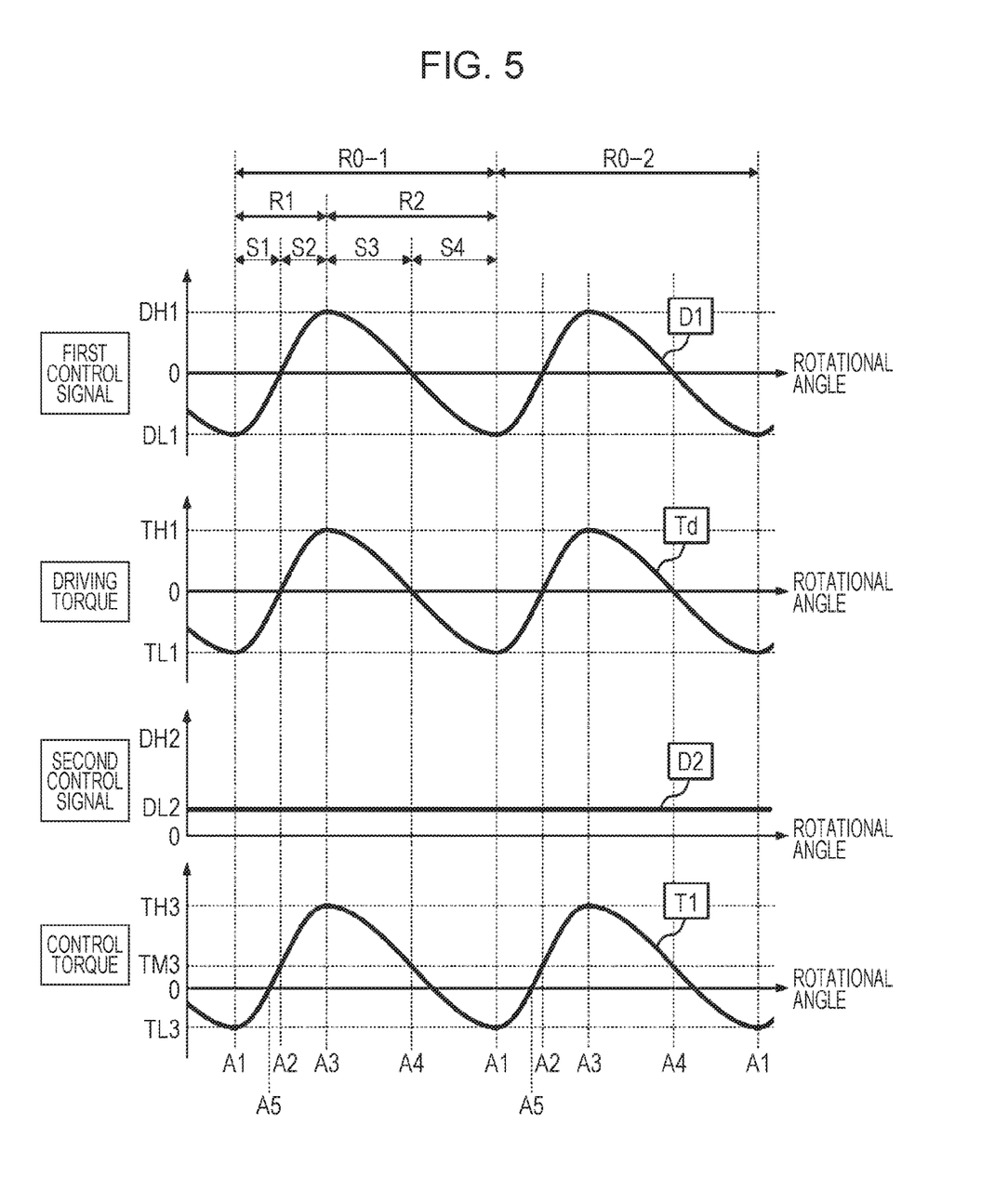
FIG. 5 illustrates an example of a first control signal and a second control signal that change according to a rotational angle as well as driving torque and control torque that correspond to these control signals.

FIG. 5 illustrates an example of the first control signal D1 and second control signal D2 that change according to a rotational angle as well as driving torque Td and control torque T1 that correspond to these control signals. The horizontal axis in FIG. 5 illustrates the change of the rotational angle in one direction with the rotation direction of the manipulation member 102 taken as being positive. In FIG. 5, the positive first control signal D1 indicates that driving torque Td is generated in a direction to suppress the rotation of the manipulation member 102, and the negative first control signal D1 indicates that driving torque Td is generated in a direction to encourage the rotation of the manipulation member 102. Also in FIG. 5, the positive driving torque Td indicates torque that suppress the rotation of the manipulation member 102, and the negative driving torque Td indicates torque that encourages the rotation of the manipulation member 102.

The second control signal D2 in FIG. 5 specifies the magnitude of braking torque Tb. Control torque T1 in FIG. 5 indicates the sum of driving torque Td and braking torque Tb; the positive and negative signs have the same meaning as driving torque Td. Control torque T1 exemplified in FIG. 5 is true when the manipulation member 102 is rotated at a fixed speed and has not been corrected by the first correcting unit 152 described later.

When the rotation direction of the manipulation member 102 is reversed between a right turn and a left turn, the control signal creating unit 151, for example, may create the first control signal D1 and second control signal D2 as in FIG. 5 in each rotation direction. In this case, in each rotation direction, the positive first control signal D1 in FIG. 5 indicates that driving torque Td is generated in a direction to suppress the rotation of the manipulation member 102, and the negative first control signal D1 indicates that driving torque Td is generated in a direction to encourage the rotation of the manipulation member 102.

As illustrated in FIG. 5, the first control signal D1 changes with the change of the rotational angle in the same pattern in two consecutive angle ranges R0-1 and R0-2. In the range of one rotation (360°), a plurality of angle ranges similar to the angle ranges R0-1 and R0-2 are included. The plurality of angle ranges will be referred to as R0 without being distinguished. In each angle range R0, the angle data creating unit 161 creates angle data A that changes from the start point toward the end point. Thus, the first control signal creating unit 162 and second control signal creating unit 163 respectively create the first control signal D1 and second control signal D2 that similarly change in each angle range R0.

In the example in FIG. 5, a first segment R1 and a second segment R2 are included in one angle range R0. In the first segment R1 from angle data A1 to angle data A3, the first control signal D1 continuously changes from a negative peak value DL1 to a positive peak value DH1, and driving torque Td continuously changes from a negative peak value TL1 to a positive peak value TH1. At angle data A2 in the first segment R1, the first control signal D1 becomes zero and driving torque Td also becomes zero in correspondence to this.

In the second segment R2 from angle data A3 to angle data A1, the first control signal D1 continuously changes from the positive peak value DH1 to the negative peak value DL1, and driving torque Td continuously changes from the positive peak value TH1 to the negative peak value TL1. At angle data A4 in the second segment R2, the first control signal D1 becomes zero and driving torque Td also becomes zero in correspondence to this.

In a first sub-segment S1 from angle data A1 to angle data A2 and a fourth sub-segment S4 from angle data A4 to angle data A1, driving torque Td is negative, so driving torque Td is exerted in a direction to encourage the rotation of the manipulation member 102 (sometimes referred to below as the encouragement direction). In a second sub-segment S2 from angle data A2 to angle data A3 and a third sub-segment S3 from angle data A3 to angle data A4, driving torque Td is positive, so driving torque Td is exerted in a direction to suppress the rotation of the manipulation member 102 (sometimes referred to below as the suppression direction).

In the example in FIG. 5, the second control signal D2 is held at a fixed value DL2. Therefore, the braking torque Tb of the braking machine 107 is also held at a fixed value TM3.

Since control torque T1 is the sum of driving torque Td and braking torque Tb, the graph of control torque T1 illustrated in FIG. 5 is obtained by shifting the graph of driving torque Td illustrated in FIG. 5 in the positive direction by an amount equal to the value TM3 of the braking torque Tb.

Control torque T1 becomes zero at angle data A5 in the first segment R1. When the manipulation member 102 is rotated from angle data A5 to angle data A3, control torque T1 is increased in the positive direction and control torque T1 in the suppression direction is increased, so the manipulator feels resistance that is gradually increased. When angle data A3 is exceeded, control torque T1 changes from an increase to a decrease, so the manipulator feels a change in resistive force. When the manipulation member 102 is further rotated from angle data A3 to angle data A1, control torque T1 in the positive direction is gradually decreased, so the manipulator has a feeling that the resistive force is reduced. When control torque T1 becomes zero at an intermediate point in this rotation and is further increased in the negative direction, control torque T1 in the encouragement direction is increased, so the manipulator has a feeling that the manipulator is drawn in the rotation direction by the manipulation member 102.

When the manipulation member 102 is rotated beyond angle data A1, the drawing force in the encouragement direction is weakened and becomes zero at angle data A5 at which control torque T1 becomes zero. At the position of angle data A5, therefore, the manipulator can stably stop the rotation of the manipulation member 102.

First Correcting Unit 152

The first correcting unit 152 corrects a control signal (D1 or D2) according to the time-varying change of the detection value of the rotational angle detected in the rotational angle sensor 105 so that correction torque that makes the apparent inertia moment of the manipulation member 102 for rotation manipulation different from intrinsic inertia moment is added to control torque T1.

Figure 6:
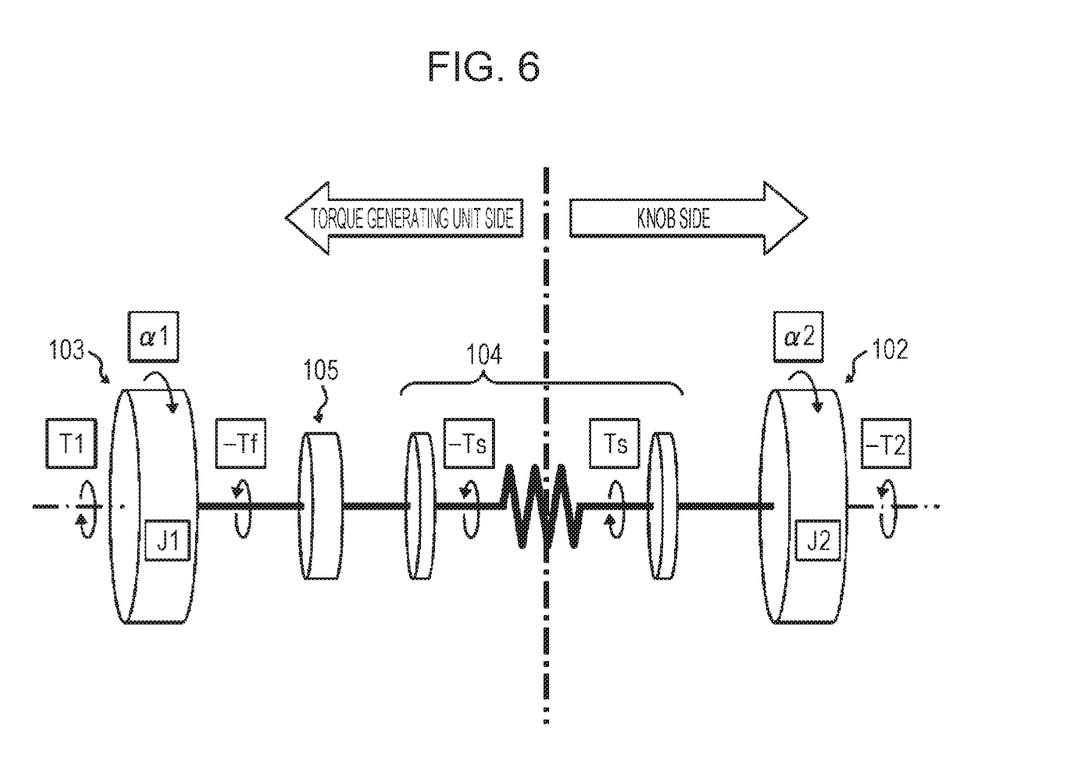
FIG. 6 is a drawing used to explain torque exerted on different portions of the rotation-type manipulation device illustrated in FIG. 1.

FIG. 6 is a drawing used to explain torque exerted on different portions of the rotation-type manipulation device 100 illustrated in FIG. 1. In FIG. 6, T1 indicates control torque generated by the torque generating unit 103, T2 indicates manipulation torque applied to the knob 111 by a rotation manipulation by the manipulator, and Ts indicates torsional torque detected in the torque sensor 104. Tf indicates error torque to be corrected by the second correcting unit 153 described later.

In FIG. 6, $\alpha2$ indicates the angular acceleration of the knob 111 and $\alpha1$ indicates the angular acceleration of the rotation of the torque generating unit 103. In this embodiment, the shaft 112 causes almost no torsion, so it will be assumed that angular accelerations $\alpha1$ and $\alpha2$ are equal to angular acceleration a.

In FIG. 6, J1 indicates the inertia moment of rotating members (rotor 121, resistive disc 135, detecting disc 141, part of shaft 112 and the like) on the same side as the torque generating unit 103 with respect to the torque sensor 104. J2 indicates the intrinsic inertia moment of rotating members (knob 111 and part of shaft 112) on the same side as the knob 111 with respect to the torque sensor 104.

Now, the error torque Tf is assumed to be zero. Then, in FIG. 6, the following equation is true for the members on the same side as the knob 111 with respect to the torque sensor 104.

$$J2 \cdot \alpha = Ts - T2 \qquad (1)$$

Here, if k is a constant coefficient, equation (1) can be deformed into the following equation.

$$(k+1) \cdot J2 \cdot \alpha = (k+1) \cdot (Ts - T2) \qquad (2)$$

Furthermore, equation (2) can be deformed into the following equation.

$$(k+1) \cdot J2 \cdot \alpha = (Ts - T2) + k \cdot J2 \cdot \alpha \qquad (3)$$

Now, it will be considered that correction torque $k \cdot J2 \cdot \alpha$ is added to control torque T1. When correction torque $k \cdot J2 \cdot \alpha$ is added to control torque T1, the detection value of torsional torque detected in the torque sensor 104 changes from Ts to $Ts + k \cdot J2 \cdot \alpha$. The detection value after this change will be assumed to be Ts'. Then, equation (3) is represented as follows.

$$(k+1) \cdot J2 \cdot \alpha = (Ts' - T2) \qquad (4)$$

As seen from a comparison of equation (4) with equation (1), by adding correction torque $k \cdot J2 \cdot \alpha$ to control torque T1, the apparent inertia moment of the manipulation member 102 for rotation manipulation becomes (k+1) times of intrinsic inertia moment J2.

Thus, the first correcting unit 152 performs correction in which correction torque $k \cdot J2 \cdot \alpha$ is added to control torque T1. Specifically, the first correcting unit 152 preferably calculates the angular acceleration a of the manipulation member 102 according to the detection value of the rotational angle detected in the rotational angle sensor 105, and preferably corrects the control signal (D1 or D2) so that correction torque $k \cdot J2 \cdot \alpha$ matching first inertia torque Ti1 inferred according to inertia moment J2 and angular acceleration a is added to control torque T1. Here, first inertia torque Ti1 is $J2 \cdot \alpha$ represented by equation (1).

The first correcting unit 152 includes an angular acceleration calculating unit 164, an inertia torque calculating unit 165, a correction signal creating unit 166, and an adding unit 167 as indicated in, for example, FIG. 4.

The angular acceleration calculating unit 164 calculates angular acceleration a by taking the second derivative of the detection value θ of the rotational angle detected in the rotational angle sensor 105.

The inertia torque calculating unit 165 calculates first inertia torque Ti1 by multiplying the angular acceleration a calculated in the angular acceleration calculating unit 164 by inertia moment J2.

The correction signal creating unit 166 creates a correction signal used to correct the first control signal D1 so that correction torque k·J2·α is added to control torque T1.

The adding unit 167 adds the correction signal created by the correction signal creating unit 166 to the first control signal D1 created by the first control signal creating unit 162.

In the example in FIG. 4, the first correcting unit 152 corrects only the first control signal D1. In another example in this embodiment, however, the first correcting unit 152 may correct both the first control signal D1 and the second control signal D2 or only the second control signal D2 to add correction torque k·J2·α to control torque T1.

Second Correcting Unit 153

The second correcting unit 153 preferably corrects a control signal (D1 or D2) so that error torque Tf becomes small, error torque Tf being the difference between control torque T1 corresponding to the control signals (D1 and D2) and control torque T1 inferred according to the detection value of torsional torque Ts detected in the torque sensor 104 and to the detection value of a rotational angel detected in the rotational angle sensor 105.

Error torque Tf is generated due to, for example, the sliding friction of the electric motor 120 in the driving machine 106, a change in the temperature of the viscosity of the magneto-rheological fluid 134 in the braking machine 107, or the like.

In FIG. 6, the following equation is true for the members on the same side as the driving machine 106 with respect to the torque sensor 104.

$$T1 = J1 \cdot \alpha + Ts + Tf \quad (5)$$

When error torque Tf is zero, control torque T1A is represented by the following equation.

$$T1A = J1 \cdot \alpha + Ts \quad (6)$$

From equation (5) and equation (6), error torque Tf is represented by the following equation.

$$\begin{aligned} Tf &= T1 - T1A \quad (1) \\ &= T1 - (J1 \cdot \alpha + Ts) \end{aligned}$$

Here, when the signal value of the first control signal D1 is D1, a coefficient used to convert the signal value D1 to driving torque Td is Kd, the signal value of the second control signal D2 is D2, and a coefficient used to convert the signal value D2 to braking torque Tb is Kb, equation (7) can be deformed into the following equation.

$$\begin{aligned} Tf &= (Td - Tb) - (J1 \cdot \alpha + Ts) \quad (8) \\ &= (Kd \cdot D1 - Kd \cdot D2) - (J1 \cdot \alpha + Ts) \end{aligned}$$

Then, the second correcting unit 153 calculates error torque Tf according to the relationship in equation (8). Specifically, the second correcting unit 153 preferably calculates the angular acceleration a of the manipulation member 102 according to the detection value of the rotational angle detected in the rotational angle sensor 105, preferably calculates second inertia torque Ti2 according to inertia moment J1 and angular acceleration a, and preferably corrects the control signal (D1 or D2) so that error torque Tf becomes small, error torque Tf being the difference between the control torque T1 corresponding to the control signals (D1 and D2) and control torque T1A inferred according to the detection value of torsional torque Ts and second inertia torque Ti2. Here, second inertia torque Ti2 is J1·α.

The second correcting unit 153 includes an angular acceleration calculating unit 168, an inertia torque calculating unit 169, a driving torque calculating unit 170, a braking torque calculating unit 171, a correction signal creating unit 172, and adding units 173 and 174 as indicated in, for example, FIG. 4.

The angular acceleration calculating unit 168 calculates angular acceleration a by taking the second derivative of the detection value θ of the rotational angle detected in the rotational angle sensor 105.

The inertia torque calculating unit 169 calculates second inertia torque Ti2 by multiplying the angular acceleration a calculated in the angular acceleration calculating unit 168 by inertia moment J1.

The driving torque calculating unit 170 calculates an inferred value of driving torque Td by multiplying the signal value of the first control signal D1 by the coefficient Kd.

The braking torque calculating unit 171 calculates an inferred value of braking torque Tb by multiplying the signal value of the second control signal D2 by the coefficient Kb.

The adding unit 173 calculates error torque Tf by subtracting the inferred value, calculated in the braking torque calculating unit 171, of braking torque Tb, second inertia torque Ti2 calculated in the inertia torque calculating unit 169, and the detection value of torsional torque Ts detected in the torque sensor 104 from the inferred value, calculated in the driving torque calculating unit 170, of driving torque Td.

The correction signal creating unit 172 creates a correction signal used to correct the first control signal D1 so that torque that offsets error torque Tf is added to control torque T1.

The adding unit 174 adds the correction signal created in the correction signal creating unit 166 to the first control signal D1 created in the first control signal creating unit 162.

In the example in FIG. 4, the second correcting unit 153 corrects only the first control signal D1. In another example in this embodiment, however, both the first control signal D1 and the second control signal D2 or only the second control signal D2 may be corrected to add torque that offsets error torque Tf to control torque T1.

Also, in the example in FIG. 4, calculating units (164 and 168) for angular acceleration a are provided in the first correcting unit 152 and second correcting unit 153. In another example in this embodiment, however, a single calculating unit for angular acceleration a may be shared between the first correcting unit 152 and the second correcting unit 153.

Storage Unit 109

The storage unit 109 stores constant data and variable data that are used in processing in the processing unit 108, data obtained as a result of processing, and the like. If the processing unit 108 includes a computer, the storage unit 109 may store the program 155 executed by the computer. The storage unit 109 includes, for example, a volatile memory such as a dynamic random access memory (DRAM) or static random access memory (SRAM), a non-volatile memory such as a flash memory, a hard disk, or the like.

Interface Unit

The interface unit 110 is a circuit used to transmit and receive data between the rotation-type manipulation device 100 and another device (such as a host computer that accepts manipulation information from the rotation-type manipulation device 100 and uses the manipulation information in processing). The processing unit 108 outputs information (such as manipulation information involved in rotation manipulation for the manipulation member 102) stored in the storage unit 109 from the interface unit 110 to a device (not illustrated).

The interface unit 110 may acquire the program 155 executed by the computer in the processing unit 108 from a server or the like on a network and may load the program 155 into the storage unit 109. In another example, the interface unit 110 may include a read device that reads the program 155 from a non-temporary tangible medium (such as an optical disk or universal serial bus (USB) memory) and stores the program 155 in the storage unit 109.

Figure 7:
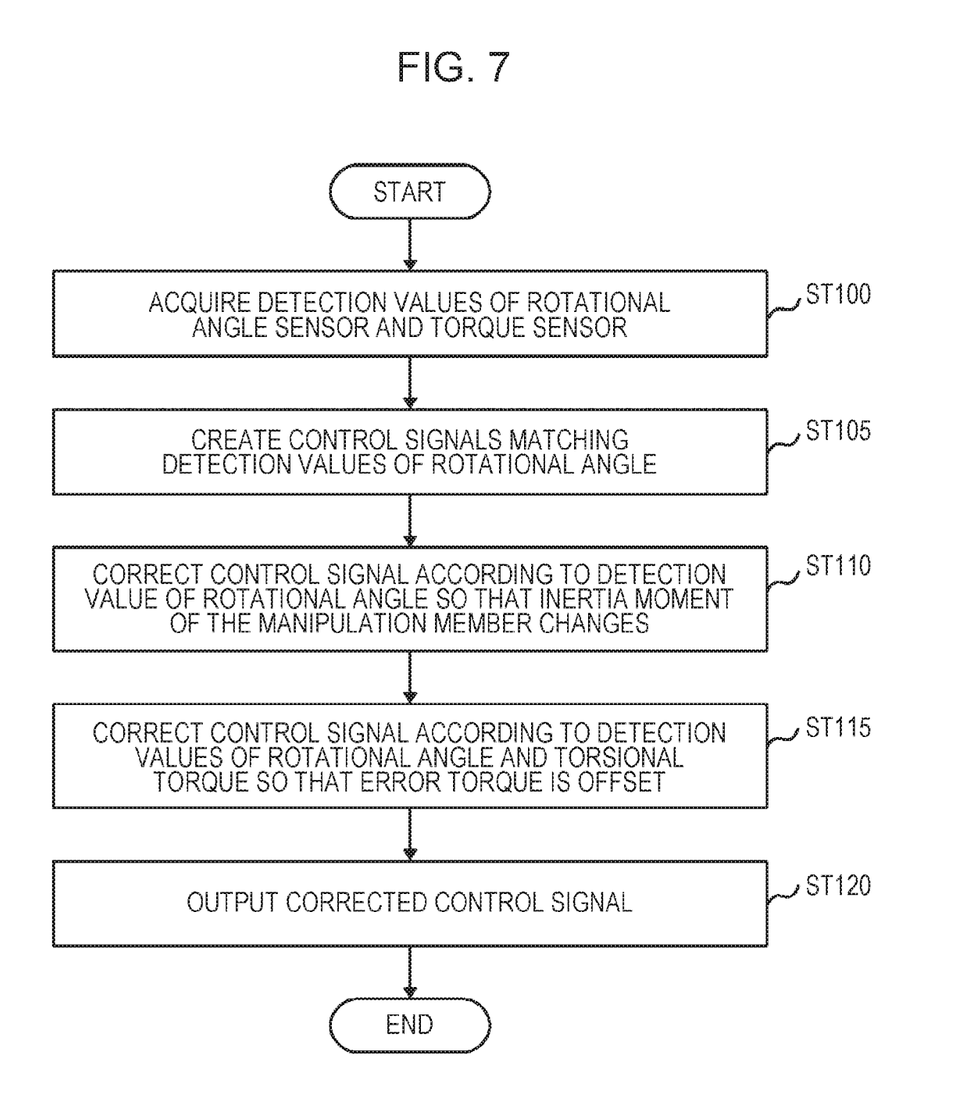
FIG. 7 is a flowchart used to explain processing involved in creation and correction of the control signals.

Here, processing involved in the creation and correction of control signals (D1 and D2), the processing being executed by the rotation-type manipulation device 100 having the structure described above, will be described with reference to the flowchart illustrated in FIG. 7. Processing in the flowchart in FIG. 7 is executed, for example, each time detection results are acquired from the rotational angle sensor 105 and torque sensor 104 at a predetermined interval.

ST100

The processing unit 108 acquires the detection value of the rotational angle, detected in the rotational angle sensor 105, of the manipulation member 102 and the detection value of torsional torque Ts detected in the torque sensor 104.

ST105

The control signal creating unit 151 creates the first control signal D1 and second control signal D2 matching the detection values, acquired in step ST100, of the rotational angle.

ST110

The first correcting unit 152 corrects a control signal (D1 or D2) according to the time-varying change of the detection value of the rotational angle, the detection value having been acquired in step ST100, so that correction torque that makes the apparent inertia moment of the manipulation member 102 different from intrinsic inertia moment J2 is added to control torque T1. For example, the first correcting unit 152 calculates the angular acceleration a of the manipulation member 102 according to the detection value of the rotational angle detected in the rotational angle sensor 105, and calculates correction torque k·J2·α matching first inertia torque Ti1 inferred according to inertia moment J2 and angular acceleration a. The first correcting unit 152 corrects the control signal (D1 or D2) so that the calculated correction torque k·J2·α is added to control torque T1.

ST115

The second correcting unit 153 corrects a control signal (D1 or D2) according to the detection value of the rotational angle and the detection value of torsional torque Ts, these detection values having been acquired in step ST100, so that error torque Tf becomes small. For example, the first correcting unit 152 calculates the angular acceleration a of the manipulation member 102 according to the detection value of the rotational angle detected in the rotational angle sensor 105, calculates second inertia torque Ti2 according to inertia moment J1 and angular acceleration a, and calculates, as error torque Tf, the difference between control torque T1 corresponding to the control signals (D1 and D2) and control torque T1A inferred according to the detection value of torsional torque Ts and second inertia torque Ti2. The second correcting unit 153 corrects the control signal (D1 or D2) so that torque that offsets the calculated error torque Tf is added to control torque T1.

ST120

The processing unit 108 outputs the control signal (D1 or D2) corrected in steps ST100 and ST115 to the torque generating unit 103 so that control torque T1 responsive to the control signals (D1 and D2) is generated.

As described above, according to this embodiment, a control signal (D1 or D2) is corrected according to the time-varying change of the detection value of the rotational angle, detected in the rotational angle sensor 105, of the manipulation member 102 so that correction torque that makes the apparent inertia moment of the manipulation member 102 different from intrinsic inertia moment J2 is added to control torque T1. When the apparent inertia moment of the manipulation ember 102 is made different from intrinsic inertia moment J2, this apparent inertia moment can be made to adapt to the appearance of the texture of the manipulation member 102. Therefore, it is possible to efficiently reduce inconsistency in manipulation feeling due to the difference between the appearance of the texture of the manipulation member 102 and a load felt in an actual manipulation. For example, even if the appearance of the texture of the manipulation member 102 resembles a metal but actual inertia moment is smaller than that of the metal, it is possible to increase the apparent inertia moment of the manipulation member 102. Therefore, it is possible to simulate large inertia torque as with a metal.

According to this embodiment, a control signal (D1 or D2) is corrected so that error torque Tf, which is the difference between control torque T1 corresponding to the control signals (D1 and D2) and control torque T1A inferred according to the detection value of torsional torque Ts and the detection value of the rotational angle, is reduced. Since error torque Tf becomes small due to this correction, the apparent inertia moment of the manipulation member 102 can be precisely set. Therefore, it becomes possible to make the apparent inertia moment of the manipulation member 102 likely to match the appearance of the texture of the manipulation member 102. Therefore, inconsistency in manipulation feeling can be more efficiently reduced.

According to this embodiment, driving torque Td responsive to the first control signal D1 is generated in the driving machine 106, and braking torque Tb responsive to the second control signal D2 is generated in the braking machine 107. Due to different combinations of driving torque Td and braking torque Tb, therefore, it is possible to create control torque T1 that produces various manipulation feelings.

According to this embodiment, when the viscosity of the magneto-rheological fluid 134 is changed by using a magnetic field generated by the magnetic field control unit 132, braking torque Tb to be applied to the manipulation member 102 is changed. Therefore, precise control of braking torque Tb becomes possible unlike a method in which a mechanical friction force is applied to the manipulation member 102.

The present invention is not limited to the embodiment described above. The present invention includes various variations.

For example, although the above embodiment has described the shape and structure of the manipulation member 102, the means for generating control torque T1 in the torque generating unit 103, the means for detecting a rotational angle in the rotational angle sensor 105, the means for detecting torsional torque Ts in the torque sensor 104, and the like, these are just examples. Each of them can be replaced with another shape, structure, mechanism, means, or the like that matches the relevant embodiment.

What is claimed is:

1. A rotation-type manipulation device comprising:
   a manipulation member that is rotatable according to a rotation manipulation;
   a torque generator that generates control torque used to drive rotation of the manipulation member or apply a brake to the rotation in response to a received control signal;
   a rotational angle sensor that detects a rotational angle of the manipulation member;
   a control signal creating unit that creates the control signal matching a detection value of the rotational angle detected in the rotational angle sensor;
   a first correcting unit that corrects the control signal according to a time-varying change of the detection value of the rotational angle so that correction torque that makes apparent inertia moment of the manipulation member for the rotation manipulation different from intrinsic inertial moment is added to the control torque;
   a torque sensor that detects torsional torque exerted between a portion to which manipulation torque due to the rotation manipulation is applied in the manipulation member and a portion to which the control torque is applied; and
   a second correcting unit that calculates angular acceleration of the manipulation member according to the detection value of the rotational angle, calculates second inertia torque according to the angular acceleration and inertia moment of a rotating member on the same side as the torque generator with respect to the torque sensor and wherein second correcting unit corrects the control signal to reduce an error torque, wherein the error torque comprises a difference between the control torque corresponding to the control signal and the control torque inferred according to the detection value of the torsional torque and the second inertia torque.

2. The rotation-type manipulation device according to claim 1, wherein the first correcting unit calculates angular acceleration of the manipulation member according to the detection value of the rotational angle, and corrects the control signal so that the correction torque matching first inertia torque inferred according to inertia moment of the manipulation member and the angular acceleration is added to the control torque.

3. The rotation-type manipulation device according to claim 1, wherein:
   the torque generator includes:
      a driving machine that generates driving torque that drives the rotation of the manipulation member according to a received first control signal, and
      a braking machine that generates braking torque that applies a brake to the rotation of the manipulation member according to a received second control signal;
   the first correcting unit corrects at least one of the first control signal and the second control signal; and
   the second correcting unit corrects at least one of the first control signal and the second control signal.

4. The rotation-type manipulation device according to claim 3, wherein the braking machine includes:
   a magneto-rheological fluid in contact with the manipulation member, and
   a magnetic field control unit that generates a magnetic field responsive to the second control signal and changes viscosity of the magneto-rheological fluid by using the magnetic field.

5. The rotation-type manipulation device according to claim 3, wherein the control signal creating unit creates the first control signal and the second control signal that have a signal value corresponding to the detection value of the rotational angle, according to a preset correspondence between the rotational angle of the manipulation member and a signal value of the first control signal and to a preset correspondence between the rotational angle of the manipulation member and a signal value of the second control signal.

6. The rotation-type manipulation device according to claim 3, further comprising a case that rotatably supports the manipulation member, wherein:
   the manipulation member includes a shaft that is rotatably supported by the case, and also includes a knob fastened to the shaft;
   the driving machine generates the driving torque that drives rotation of the shaft;
   the braking machine generates the braking torque that applies a brake to the rotation of the shaft; and
   the torque sensor detects torsional torque exerted between a portion to which the driving torque and braking torque are applied on the shaft and a portion to which the knob is fastened.

7. A control method for a rotation-type manipulation device, wherein:
   the rotation-type manipulation device has
      a manipulation member that is rotatable according to manipulation torque applied through a rotation manipulation;
      a torque generator that generates control torque used to drive rotation of the manipulation member or apply a brake to the rotation in response to a received control signal, and
      a rotational angle sensor that detects the rotational angle of the manipulation member,
   the control method comprising:
      creating the control signal matching a detection value of the rotational angle detected in the rotational angle sensor;
      correcting the control signal according to a time-varying change of the detection value of the rotational angle so that correction torque that makes apparent inertia moment of the manipulation member for the rotation manipulation different from intrinsic inertial moment is added to the control torque;
      detecting, with a torque sensor, a torsional torque exerted between a portion to which manipulation torque due to the rotation manipulation is applied in the manipulation member and a portion to which the control torque is applied;
      calculating an angular acceleration of the manipulation member according to the detection value of the rotational angle;

calculating a second inertia torque according to the angular acceleration and inertia moment of a rotating member on the same side as the torque generator with respect to the torque sensor; and correcting the control signal to reduce an error torque, wherein the error torque comprises a difference between the control torque corresponding to the control signal and the control torque inferred according to the detection value of the torsional torque and the second inertia torque.

8. A nonvolatile memory having stored therein a program that causes a computer to execute a control method for a rotation-type manipulation device wherein:

A control method for a rotation-type manipulation device, wherein:

the rotation-type manipulation device has:
- a manipulation member that is rotatable according to manipulation torque applied through a rotation manipulation;
- a torque generator that generates control torque used to drive rotation of the manipulation member or apply a brake to the rotation in response to a received control signal, and
- a rotational angle sensor that detects the rotational angle of the manipulation member, and wherein when the program is executed by the computer, the computer causes the rotation-type manipulation device to:

create the control signal matching a detection value of the rotational angle detected in the rotational angle sensor; and correct the control signal according to a time-varying change of the detection value of the rotational angle so that correction torque that makes apparent inertia moment of the manipulation member for the rotation manipulation different from intrinsic inertial moment is added to the control torque;

detect, with a torque sensor, a torsional torque exerted between a portion to which manipulation torque due to the rotation manipulation is applied in the manipulation member and a portion to which the control torque is applied;

calculate an angular acceleration of the manipulation member according to the detection value of the rotational angle;

calculate a second inertia torque according to the angular acceleration and inertia moment of a rotating member on the same side as the torque generator with respect to the torque sensor; and correct the control signal to reduce an error torque, wherein the error torque comprises a difference between the control torque corresponding to the control signal and the control torque inferred according to the detection value of the torsional torque and the second inertia torque.

* * * * *